3,466,993
**OPERATING MECHANISM FOR
PHOTOGRAPHIC SHUTTER**
Paul Fahlenberg, Baierbrunn, and Klement Kleeberger, Munich, Germany, assignors to Compur-Werk Gesellschaft mit beschrankter Haftung & Co., Munich, Germany, a firm of Germany
Filed Nov. 14, 1966, Ser. No. 594,167
Claims priority, application Germany, Nov. 24, 1965, C 37,477
Int. Cl. G03b 9/14
U.S. Cl. 95—63                          6 Claims

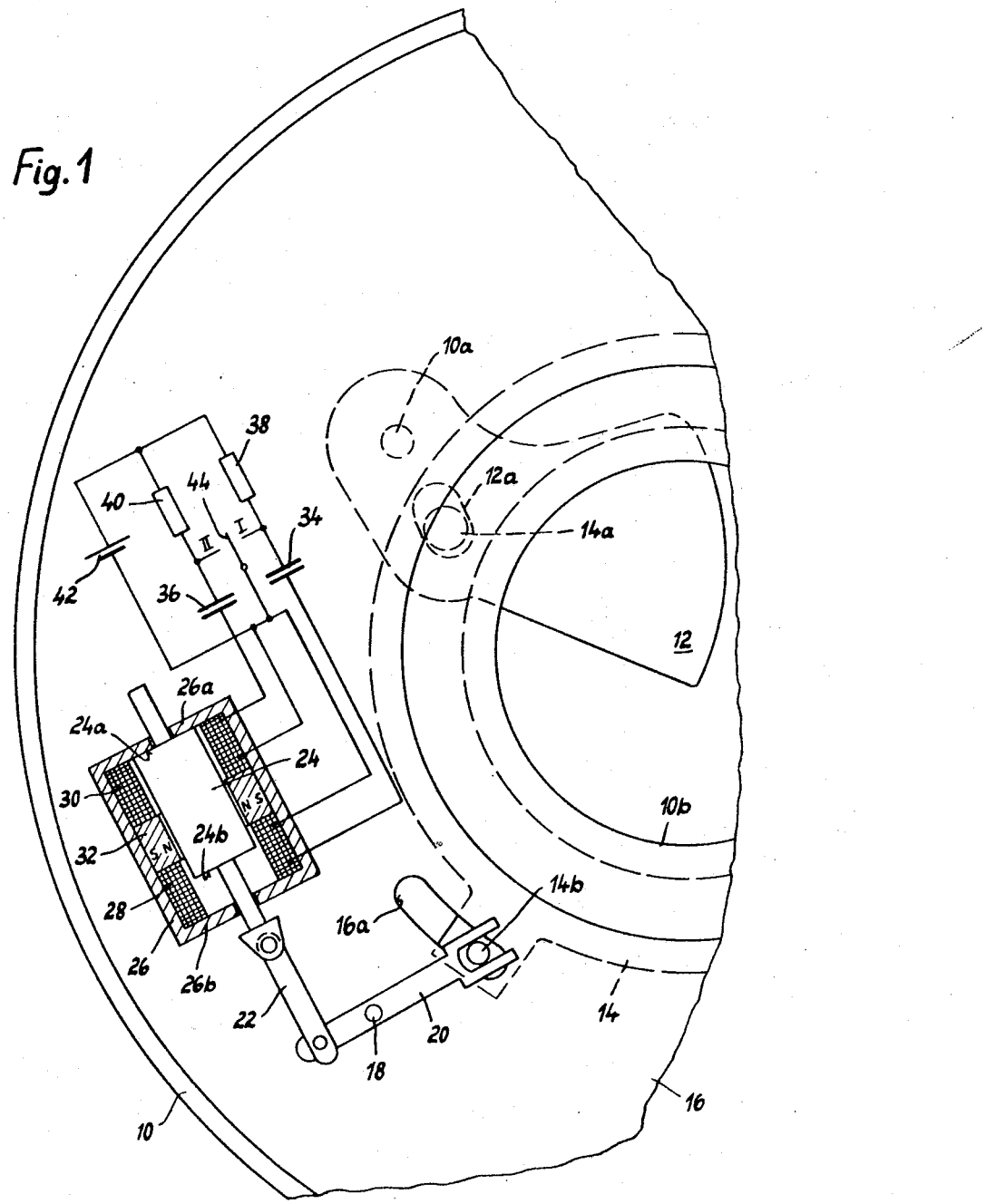

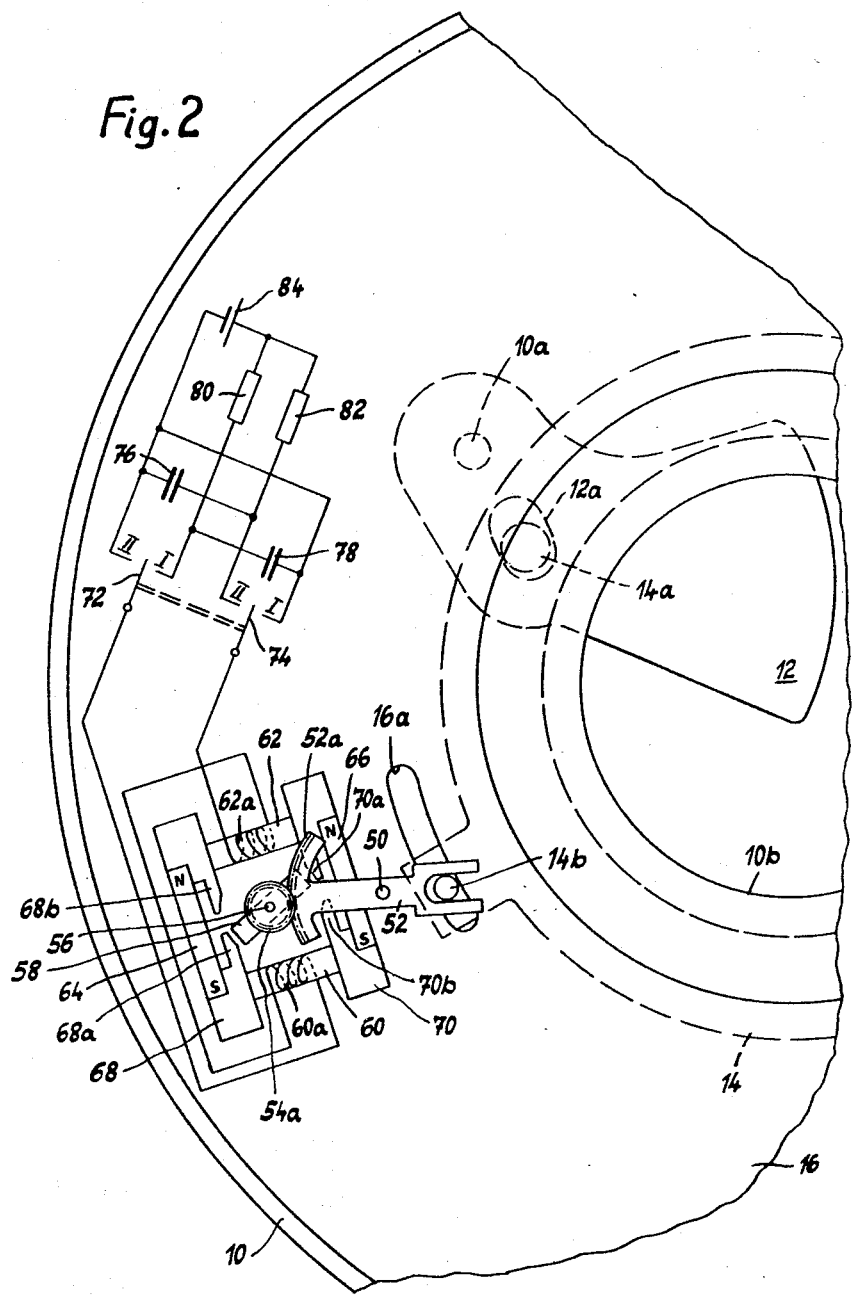

ABSTRACT OF THE DISCLOSURE

A shutter system which driven by a driving member between the open and the closed position. The driving member consists of a closed magnetic system, with a permanent magnet at one end and an electromagnet at the other. The armature moves back and forth, hence the shutters open and close, depending on when the electromagnet is energized.

---

This invention relates to a photographic shutter and to the means for driving the shutter elements to open and closed positions wherein electromagnetic means drives the shutter elements to the end positions and permanent magnetic means retains the elements in the end positions.

In the prior art it is known to utilize electromagnetic means to drive the blade ring to move the shutter elements between open and closed positions with the driving member being held in the end positions by means of springs. However, the use of springs involves the drawback that the driving electromagnets must work against the springs and therefore must be more powerful than is necessary in order to operate the shutter. The electromagnets and associated circuitry are therefore more costly than necessary and utilize more space in the shutter than essential.

According to the present invention permanent magnetic means are utilized in place of springs in order to retain the driving member in the end positions. When the electromagnetic means is energized to drive the shutter elements, the permanent magnetic means assists in causing the driving member to move to the other end position. By virtue of this arrangement less costly electromagnetic means may be employed and more space within the shutter is available for other purposes.

In one specific embodiment of the invention the blade driving ring is coupled to a displaceable magnetic armature, the armature being surrounded by a pair of electromagnetic coils with an annular permanent magnet disposed therebetween. The permanent magnet may be radially magnetized and the coils and magnet disposed within a metallic casing with the armature moving between the end walls of the casing defining the open and closed position of the shutter elements.

According to another embodiment of the invention a magnetic armature is rotatably mounted with a pair of electromagnets and a pair of longitudinally magnetized permanent magnets disposed symmetrically adjacent the arcuate path of movement of the armature. In this embodiment also the permanent magnets performs the dual function of retaining the driving member in the end positions and assisting in moving the driving member.

An object of the present invention is to provide improved means for moving shutter elements between open and closed positions including permanent magnet means for retaining the driving member in its end positions.

Other objects and many of the attendant advantages will be come more readily apparent upon consideration of the following detailed specification in connection with the accompanying drawings, wherein:

FIGURE 1 is a plan view of one embodiment of a shutter construction with a longitudinally displaceable driving armature, and FIGURE 2 is a plan view of a second embodiment of a shutter with a rotatable driving armature.

FIGURE 1 illustrates a shutter having a number of shutter blades 12 mounted in the housing 10 thereof. Only one blade has been shown in the drawing for simplicity. Each of the shutter blades 12 is pivotally mounted in the housing 10 at 10a and provided with a control slot 12a in which there is engaged a control pin 14a of a blade driving ring 14 which is rotatably mounted around the front tube 10b of the shutter. A further pin 14b on the blade driving ring 14 passes through an arcuate slot 16a in a base plate 16 which is fastened in the shutter housing 10 and is connected to a fork 20 which is rotatably mounted on 18 and is coupled through a link member 22 with one end of the longitudinally displaceable, metallic magnetic armature 24. This armature is part of a polarized magnetic system installed in a metallic casing 26. This system includes two magnetic coils 28 and 30 and an annular permanent magnet 32, which is radially magnetized as shown, the magnet being disposed between the coils 28 and 30.

The coils 28 and 30 of the two electromagnets are electrically connected to condensers 34 and 36, the condensers comprising energy storage devices and being charged through associated resistances 38, 40 from a battery 42. In addition a changeover switch 44 is provided, this being movable from the rest position illustrated in the drawings, either in the switching direction I or direction II. In the position illustrated the electrical and mechanical elements are in their rest position with the blades 12 closed. The field of the permanent magnet 32 causes the end 24a of the armature 24 to press against wall 26a of housing 26, and be held in this position by magnetic attraction. This accurately defines the closure position on the blades 12.

If now that shutter is to be opened, the switch 44 is changed over to position I. The charged condenser 34 is short circuited and discharged. The magnetizing impulse consequently set up in the coil 28 causes the armature 24 to move from the limit position illustrated into the other limit position in which its end 24b is applied against wall 26b of the housing 26. A further result of the magnetizing impulse is, however to change the polarity of the armature 24 at 24a. As a result the part 24a of the armature now seeks to withdraw from the part 26a of the housing, and in this way the permanent magnet 32 assists the action of the electromagnet 28.

The movement of armature 24 towards wall 26b initiated by energization of electromagnet 28, results in the blade driving ring 14 being moved in the clockwise direction through the link 20, 22, so that the blades are moved into their opened position. Once again, in this position an accurately defined limit position is set up by the fact that the part 24b of the armature remains held against the wall 26b under the action of the permanent magnet 32.

Since the energy for this magnetizing impulse is taken from the condenser 34, the battery voltage is only imparted through resistances 38 when the switch 44 is closed so that, after the magnetizing impulses has decayed, only a small residual current from the battery 42 flows to the condenser 34. As soon as the switch 44 is moved back from contact position I into the rest position illustrated, the condenser starts to charge up afresh. If the switch 44 is now moved over into contact position II and a magnetizing impulse is emitted from condenser 36 to the winding 30, the consequent procedure follows the pattern described above, but in the opposite sense. As soon as the armature 24 moves back into the illustrated position the opened shutter blades are closed again.

It is possible to install the electrical elements 34–42 in the shutter housing, in which event the switch 44 is coupled to an operating grip piece or the like projecting from the shutter housing. If need be, however, these electrical elements can be disposed in a switch box separate from the shutter housing and connected through a cable with the magnetic system inside the shutter. This permits remote control operation of the shutter. Finally it is possible to control the changeover motions of the switch 44 automatically by means of an electronic or mechanical arrangement for the purpose of establishing a delay period, thereby permitting a selective setting of the exposure period of the shutter.

FIGURE 2 illustrates another embodiment of the magnetic shutter drive. In this case a fork 52, pivoted at 50, engages a pin 14b of the blade driving ring 14, this fork having at its other end a toothed segment 52a. Engaging this segment is a toothed pinion 54a connected to a metallic magnetic armature 58, both the pinion and armature being pivotally mounted at 56. Two electromagnets and two permanent magnets are distributed symmetrically adjacent to and along the arcuate path of travel of this magnetic armature 58, and these together constitute a polarized magnetic system. The metallic core, 60 and 62 respectively, of each electromagnet is surrounded by a coil 60a and 62a respectively. These two coils are connected in series so that the two electromagnets are mutually assisting in their action. The permanent magnets 64 and 66 are in the form of longitudinally magnetized plates which are connected to the cores of the electromagnets with the assistance of metallic holders 68, 70.

As explained in the FIGURE 1 embodiment, the electromagnets are alternately connected to the condensers 76 and 78 through a double switch 72, 74 and these condensers are charged from battery 84 through limit resistances 80, 82.

In the rest position of the magnetic driving system illustrated, the armature 58 is held in a specific rest position, when the blades 12 are closed, by virtue of the magnetic field produced by the permanent magnets 64, 66 between the projections 68a and 70a and the two ends of this armature.

If the switch is moved into position I, a magnetizing impulse is applied to the two electromagnets and this produces a pivoting of the magnetic armature 58 from the end position illustrated into the other end position, in which the armature is held by the magnetic action at the projection 68b, 70b in a defined position with the blades 12 open. As explained in connection with the first example the two permanent magnets assist the electromagnets and thereby impart an increased degree of efficiency in the arrangement.

In position II of the switch a magnetizing impulse is imparted to the electromagnets but this however travels in the opposite sense to the first described impulse. Consequently, the armature 58 is pivoted back from the position corresponding to shutter blades open into the position illustrated with the shutter blades closed.

It is to be noted that, when use is made of the polarized system described, in the first place the two end positions of the shutter drive are exactly defined without recourse to spring power, and furthermore, it is possible to obtain a substantially increased effect than with a normal electromagnet. It is thus possible to implement the arrangement with smaller batteries.

Obviously many modifications and variations of the present invention are possible in light of the foregoing teachings without departing from the spirit of the invention as defined in the appended claims.

What is claimed as new and is desired to be secured by Letters Patent is:

We claim:

1. A photographic shutter including shutter elements, a reciprocable driving member operatively connected to the shutter elements and movable between end positions for driving the shutter elements between open and closed positions, electromagnetic means including a movable magnetic armature for reciprocating said driving member, and permanent magnet means for retaining the driving member in the end positions thereof and for assisting the electromagnetic means in reciprocating the driving member, said electromagnetic means and permanent magnet means constituting a closed magnetic system surrounding said armature and defining a minimal air gap between said armature and the magnetic poles of the closed system.

2. A photographic shutter according to claim 1, wherein said permanent magnet means includes an annular magnet surrounding the magnet armature and the electromagnetic means including coils surrounding the magnetic armature.

3. A photographic shutter according to claim 2, wherein said annular magnet is radially magnetized.

4. A photographic shutter according to claim 1, wherein said armature comprises a rotatably mounted magnetic armature means coupling the magnetic armature to the driving member, the permanent magnetic means comprising two longitudinally magnetized permanent magnets, the permanent magnets in the electromagnetic means being symmetrically disposed adjacent the arcuate path of travel of the rotatable armature.

5. A photographic shutter comprising shutter elements, a blade driving ring coupled with the shutter elements, means for driving the blade driving ring between end positions for opening and closing the shutter elements, said driving means including linkage means coupled with the blade driving ring, a magnetic armature on said linkage means, a metallic casing for said armature, the armature being slidable between the end walls of the casing, an annular permanent magnet surrouding the armature and a pair of electromagnetic coils one coil being disposed between each end of the permanent magnet and the adjacent end of the casing, and energy storage means connected to the electromagnetic coils whereby the magnetic field of the permanent magnet retains the armature against the ends of the casing in the end positions of the blade driving ring and upon energization of one of the electromagnetic coils to drive the armature of the opposite end of the casing the field of the permanent magnet assists the driving movement.

6. A photographic shutter comprising shutter elements, a blade driving ring coupled with the shutter elements, means for driving the blade driving ring between end positions for opening and closing the shutter elements, said driving means including a pivoted link having a toothed segment at one end thereof, a rotatable toothed pinion engageable with the toothed segment, an armature movable with the toothed pinion, a pair of permanent magnets oppositely disposed adjacent the arcuate path of travel of the armature and a pair of oppositely disposed electromagnets whereby the electromagnets and permanent magnets are symmetrically disposed and energy storage means connected to the electromagnetic coils whereby the magnetic field of the permanent magnets retains the armature with the blade driving ring in the end positions and upon energization of the electromagnetic coils to drive the blade driving ring to the opposite end position the permanent magnets assist the driving movement.

References Cited

UNITED STATES PATENTS

| | | | |
|---|---|---|---|
| 2,999,445 | 9/1961 | Fahlenberg | 95—63 |
| 3,092,002 | 6/1963 | Frenk | 95—53 |
| 3,056,342 | 10/1962 | Land | 95—62 |

FOREIGN PATENTS 376,765  5/1964  Switzerland.

NORTON ANSHER, Primary Examiner

DAVID B. WEBSTER, Assistant Examiner

U.S. Cl. X.R

95—53, 62